Jan. 30, 1968 T. A. UNDERWOOD 3,366,522
METHOD OF MAKING A FILAMENT WOUND CLOSED CONTAINER
Filed Feb. 21, 1964
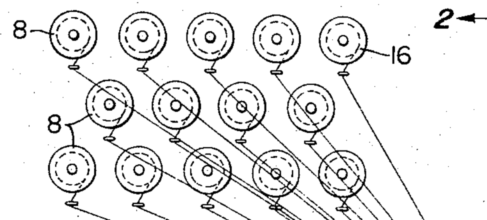
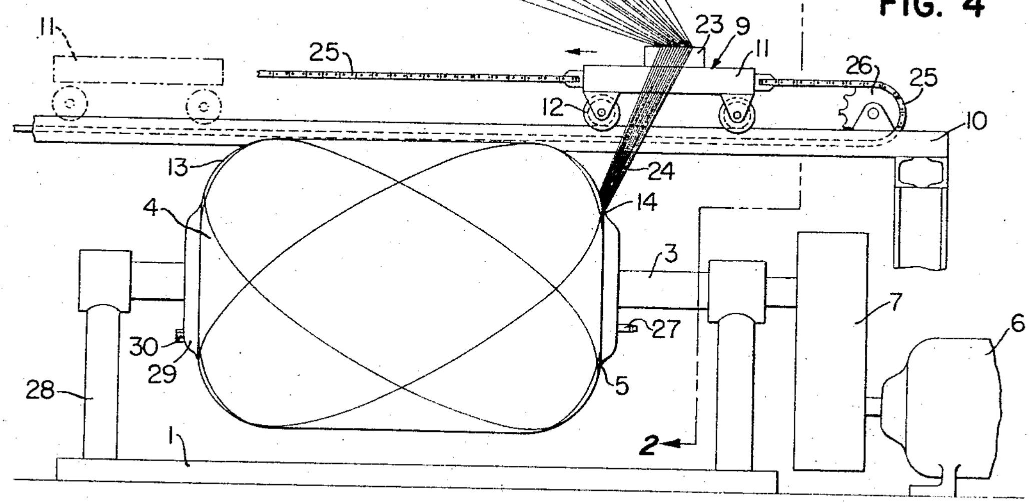
FIG. 1
FIG. 4
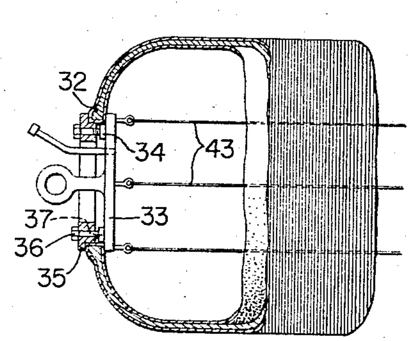
FIG. 3
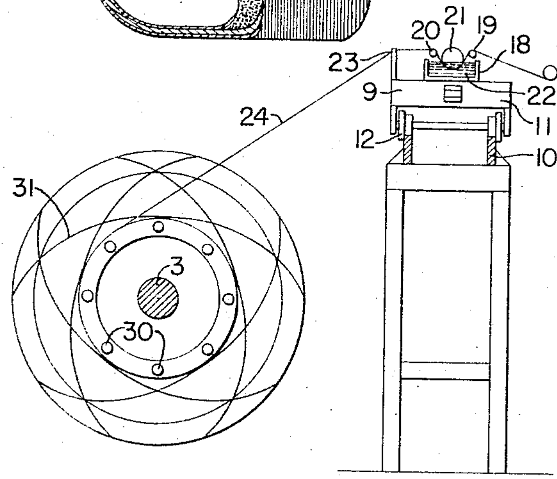
FIG. 2
INVENTOR.
THEODORE A. UNDERWOOD
BY
J. B. Holden
ATTORNEY United States Patent Office 3,366,522

Patented Jan. 30, 1968

1

3,366,522

METHOD OF MAKING A FILAMENT WOUND CLOSED CONTAINER

Theodore A. Underwood, Akron, Ohio, assignor to The Goodyear Tire & Rubber Company, Akron, Ohio, a corporation of Ohio Filed Feb. 21, 1964, Ser. No. 346,443
13 Claims. (Cl. 156—69)

ABSTRACT OF THE DISCLOSURE

This invention relates to a method of making a reinforced container having closing means comprising coating a mandrel, which may be collapsible, with a spray coat of a liquid polyurethane reaction mixture, wrapping over the coating on the mandrel a fabric reinforcing member, applying at least one coat of liquid polyurethane reaction mixture over the member, curing the reaction mixture and removing from the mandrel. Closure means may be built into the container as an integral part and liquid reaction mixture comprises a reactive hydrogen containing polymeric material, organic diisocyanate and a crosslinker such as diamines and glycols.

This invention relates to a method for preparing fibrous wound containers and to said containers. More specifically, this invention relates to a method of preparing polyurethane containers which contain a continuous filament reinforcement and to said containers.

An object of this invention is to provide a method for preparing polyurethane containers containing filament reinforcement.

The object of this invention may be accomplished by applying at least one coat of a liquid polyurethane reaction mixture over a building form to which the cured polyurethane does not adhere, then wrapping the form containing at least one coat of a liquid polyurethane reaction mixture with a continuous fibrous material, applying at least one additional coat of liquid polyurethane reaction mixture over the wrap and then the liquid polyurethane reaction mixture is reacted and cured to obtain a continuous fibrous reinforced container.

In the drawing, FIG. 1 is a side elevational view of the apparatus for building the container and FIG. 2 is an end elevational view taken along the line 2—2 of FIG. 1. FIG. 3 is a partial cross-section through one end of the finished container. FIG. 4 is a partial cross-section through one end of a container having an insert member.

Reference to FIG. 1 will more clearly illustrate the procedural steps of accomplishing this invention. Referring specifically to FIG. 1, numeral 1 is a support frame having a shaft 3, rotatably positioned in the support frame. The shaft has mounted thereon an inflatable building mandrel 4.

The inflatable building mandrel preferably has the configuration shown and is made of an elastomeric material which may be inflated and deflated. Normally about 5 to 10 pounds per square inch pressure is sufficient to give the desired inflation. Before applying the liquid polyurethane reaction mixture to the inflated building mandrel 4, it is desirable that the mandrel be treated or be made of a material to which the liquid reaction mixture will not adhere.

2

One method of preventing the liquid reaction mixture from adhering to the building mandrel is to apply a coat of polyethylene or other waxy material over the surface of the building mandrel which is preferably of an elastomeric material such as polyurethane. The liquid polyurethane reaction mixture preferably is applied to the building mandrel by spraying the liquid reaction mixture on the surface of the mandrel while it is rotating. The amount of material sprayed onto the surface and the number of coats is usually chosen to given the desired thickness for the service in which the container is to be used. For instance, the coats of polyurethane liquid reaction mixture applied to the surface of the building mandrel may be from 5 to 100 mils thick. Before the last coat of the liquid polyurethane reaction mixture applied to the building mandrel has had time to react and cure, the coating on the building mandrel is wrapped with a continuous filament such as a nylon fabric or glass, although other fabrics, including metal filaments, may be used.

The nylon filaments are attached to the mandrel in the position 5 and then the mandrel is slowly rotated by means of the motor 6 through the gear means 7 which has variable gear ratios to permit control of the speed and direction of rotation. The continuous filament is fed to the mandrel from the sets of spools 8 through a filament guide means 9 which is adapted to move back and forth axially along the track 10 to wrap the filament around the rotating mandrel, in the desired geometrical pattern, for instance, a spiral or helical wrap or a circumferential wrap or preferably a combination of helical and circumferential wraps.

Where the wrap around the mandrel is in a helical or spiral pattern the filament guide means 9 is moved along the track 10 by means of carriage 11. Carriage 11 has wheels 12 which roll along tracks 10 by means of the chain sprocket means. It should be indicated that the speed of the filament guide means relative to the rotation of the mandrel determines the angle of wrap. When the wrap filament reaches the opposite end 13 of the mandrel, the mandrel is rotated through a suitable angle, about 72° for a five-point star pattern, before the travel of the filament guide 9 is reversed to move it back to the other end 14 of the mandrel. Thus, each time the filament reaches ends 13 or 14 the filament guide 9 is stopped and again the mandrel is rotated through the desired angle to give the desired end wrap pattern before the travel of the filament guide means is reversed. It is preferred that the filament be maintained under the same tension as during the travel of the filament guide. This is readily accomplished by use of induction motors 15 which automatically control the tension on the filament by controlling the speed and direction of rotation of each of the spools 16 while the filament is being fed to and through the filament guide and wrapped onto the mandrel.

Referring to FIG. 2 it is readily apparent that the continuous filaments leave the spools 16 and pass over the tongues 17 down to the filament guide means 9 and over to the dip tank 18. The filaments pass through the dip roll by passing over tension rolls 19 and 20 and underneath dip roll 21 to immerse the filaments in the coating material (the liquid polyurethane reaction mixture) held in the dip bath 22. The filaments leave the dip bath 22 by passing over tension roll 20 to the comb 23 which aligns the numerous individual filaments into a continuous contiguous band 24 which passes to the mandrel where the band is wrapped on the mandrel in accordance with the desired wrap pattern, for instance, either helically or circumferentially. It should be noted that the dip roll is mounted on a carriage 11 which moves back and forth along the tracks 10, the carriage being moved by an endless chain 25 which passes over a pair of sprockets such as the one indicated by the numeral 26.

When the mandrel has been wrapped with the desired wrap pattern, the filaments wrapped on the mandrel is spray covered with at least 1 and preferably 2 or more coats of a liquid polyurethane reaction mixture. The coating of the liquid polyurethane reaction mixture is allowed to react and set before the mandrel is deflated by applying a vacuum to the inflation means 27 to collapse the mandrel and permit the built-up polyurethane reinforced container to be removed from the building mandrel. It is preferred that the upright support 28 be of the type which may be moved off the shaft 3 to permit the built-up container to be removed from the mandrel and off the shaft. Then the support 28 can be placed back in support position in relation to the shaft 3. If desired, the polyurethane container may be placed in a heated room or oven to hasten the curing of the polyurethane material. Usually the cure temperature used will be from about 50° F. temperature to about 250° F. from 1 to several hours.

It should be noted that since the inflatable mandrel contains a sealed plate 29 which is bolted by means of bolts 30 to the inflatable mandrel the resulting filament reinforced polyurethane container will have openings at each end, hence these openings will have to be closed with a suitable closure means. Also, in regard to the sealing of the polyurethane filament reinforced container, it should be noted that by varying the angle of wrap it is possible to get various polygon shaped figures around the mandrel flange plate 29 such as the pentagon 31 shown in FIG. 2. It is preferred that the wrap pattern on the end be such as to give a polygon having at least five sides and in some cases up to eight or nine, as this method of wrap produces a natural bead 32 which facilitates closing the ends of the filament-reinforced polyurethane containers.

The nature of the bead and end closure means can best be understood with reference to FIG. 3. A seal plate 33 is placed in the end of the container in the position shown in FIG. 3 by pressing the opposite sides of the bead member 32 together. This seal plate contains a number of projecting members 34 positioned a suitable distance from the periphery of the seal plate. With the seal plate in the position shown in FIG. 3, a seal ring 35 is placed in the position shown in this figure and the bolts 36 are screwed into the bolt holes 37 of projecting members 34, to squeeze the bead sufficiently between the seal plate and seal ring to obtain a liquid seal.

It should be understood that each end of the container may be closed with a closure means of this type. Alternately, a seal means of the type shown in FIG. 4 or other suitable means may be used.

It should be noted that it is not essential that both end closures be the same type, for instance, one may be of the type shown in FIG. 3 and the other of the type shown in FIG. 4.

The nature of the screw threaded closure may be better understood by reference to FIG. 4 wherein the numeral 38 represents a threaded insert having a threaded opening 39 within the metal or resin body thereof.

It should be noted that the layers of polyurethane coating and filament are integrally formed and attached to the shoulder 40 and the curved surface 41 of the insert 38. When an insert of this type is used it is placed over the shaft and in contact with the building mandrel prior to application of the first coat of polyurethane. The finished container is closed by screwing a cap 42 into the insert 38.

In some instances it is desirable to use anchoring strands to connect the closure members positioned between the ends of the containers. The anchoring strand can be either a single central strand or a plurality of strands such as the three cables 43 shown in FIG. 3.

Also, it is desirable that the closure members have a swivel ring or other suitable attachment means to facilitate lifting the container when filled with either a liquid or a powder. Where the swivel ring is properly positioned the cylindrical containers can be towed by attaching a line to the swivel ring in each end of the container.

The liquid polyurethane reaction mixture usually comprises an organic polyisocyanate, a reactive hydrogen containing material and a cross-linking agent and sufficient solvent to permit the mixture to be readily applied. The amount of solvent may vary from none to as high as 50% by weight or more. In normal practice it is preferred to keep the solvent below about 30% and preferably less than 20%. Suitable solvents are those normally used for alkyd resins and boiling below about 250° F.

Examples of suitable representatives solvents are methyl ethyl ketone, toluene, benzene, nitropropane, the chlorinated hydrocarbons, etc.

It should be appreciated that the reactive hydrogen containing polymeric materials are generally divided into the broad classes of polyester polyols and the polyether polyols with the polyester amides being considered by some people as a special case of the polyester materials.

Representative members of the reactive hydrogen containing polymeric materials belonging to the above classes which are useful in this invention are the polyester polyols prepared by reacting the aliphatic polycarboxylic acids such as oxalic, malonic, succinic, glutarate, adipic, suberic, sebacic, and azelaic with a polyol such as glycol. Also the unsaturated aliphatic polycarboxylic acids such as maleic and fumaric may be used.

In general, by the term "aliphatic polycarboxylic acid" we mean those carboxylic acids having from 2 to about 20 carbon atoms and preferably about 6 to 12 with the number of carboxyl groups varying from about 2 to 3 and in some cases as high as 4 to 5. Also, the aromatic polycarboxylic acids may be used.

Representative examples of these aromatic polycarboxylic acids are phthalic, terephthalic and isophthalic acid.

These polycarboxylic acids are reacted with glycols or polyols to form polyesters containing at least 2 hydroxyls though for some uses some triols and higher may be used to stiffen the product or to reduce its flexibility. Normally, where a solid polyurethane is to be formed it is preferred that the acid number of the polyester be relatively low, normally less than about 10 and preferably less than 1.

Representative examples of the polyols useful in the preparation of the polyesters are ethylene glycol, propylene glycol, tetramethylene glycol, pentamethylene glycol, decamethylene glycol, trimethylol propane, triethylol propane, glycerine, pentaerythritol, hexane triol, sorbitol and related polyols having from 2 to about 10 carbon atoms and containing from 2 to 8 hydroxyls.

Representative of the hydroxyl terminated polyethers useful in this invention are polyethylene glycol, polypropylene glycol, polytetramethylene ether glycol and the corresponding polyols having 3, 4, 5 and higher hydroxyls formed by the condensation of alkylene oxides containing from 2 to about 10 or more carbon atoms on a nucleus generating material such as trimethylol propane, glycerine, hexane triol, pentaerythritol and sorbitol. In general, where elastomeric polyurethanes are prepared it is the practice to use a reactive hydrogen containing polymeric material having a molecular weight of about 500 to about 8000 with the preferred molecular weight range being about 1500 to 3000. Also, those skilled in the art appreciate that the use of appreciable amounts of tri- and higher functional polyols lead to appreciable chain crosslinking and certain properties whereas the use of essential difunctional polyols yields a material having essentially a linear structure with some difference in properties.

Any suitable organic polyisocyanate may be utilized in the process of this invention, such as, for example, the following aliphatic ones: hexamethylene diisocyanate, undecamethylene diisocyanate, dodecamethylene diisocyanate and 3,3'-diisocyanate dipropylether; cyclopentylene-1,3-diisocyanate, cyclohexylene-1,4-diisocyanate; and the following aromatic ones: the tolylene diisocyanates, the xylylene diisocyanates, 4,4'-diphenylmethane diisocyanate, 2-nitrodiphenyl-4,4'-diisocyanate, 4,4'-diphenyl propane diisocyanate, p-isocyanato benzyl isocyanate, m-phenylene diisocyanate, p-phenylene diisocyanate, naphthylene-1,4-diisocyanate, 3,3'-dimethyl-4,4'-diphenylene-diisocyanate, p,p',p''-triphenyl methane tri-isocyanate and diphenyl-4,4,4'-triisocyanate, the polyaryl polyisocyanates and the polyalkylaryl polyisocyanates. The aromatic diisocyanates are, however, preferred. The organic polyisocyanates are used in excess, usually at least about 1.1 mols and higher for each mol of reactive hydrogen-containing polymeric material. The preferred range generally is about 1.5 to about 2 mols of polyisocyanate based on the reactive hydrogen-containing polymeric material. The excess polyisocyanate is reacted with a suitable crosslinking material such as water, glycols, amino alcohols and the primary diamines. Normally the crosslinker is used in an amount equivalent to the excess polyisocyanate. When water is used it should be appreciated that the resulting product will be porous unless steps are taken to remove the carbon dioxide generated in situ. Where the glycols and diamines are used as the crosslinking agent, the resulting product will be a homogeneous plastic. The preferred glycol for use as a crosslinking agent is butane diol, although representative examples of those listed for making the polyesters may be used, too.

The crosslinkers usually are used in the amount of about 0.1 to about .9 mol per mol of excess organic polyisocyanate over that equivalent to the polyester or polyether.

Preferred results are obtained when the amount of diamine crosslinker is about 0.3 to 0.8 mol based on the excess organic polyisocyanate. Representative examples of suitable primary diamines where conventional techniques are to be used, are the so-called slow diamines such as methylene bis-(ortho-chloroaniline), ortho-dichlorobenzidine, 4,4'-bis(amino phenyl) sulfone. Representative examples of suitable fast primary diamines are 4,4'-methylene dianiline, methyl tolidine, tolylene diamine, o-tolidine, o-dianisidine. The fast diamines preferably are dissolved in a suitable solvent before use such as the low boiling hydrocarbons and ketones.

The term "fast and slow diamines" refers to the time required for a boiling half molar solution of the diamine to develop a turbidity when mixed with a half molar boiling solution of the polyisocyanate. Where methylene chloride is the solvent a fast diamine develops a turbidity in at least 25 seconds.

The following examples illustrate the invention without, however, limiting it (all parts are by weight unless otherwise indicated):

EXAMPLE I

A continuous nylon filament reinforced container was made using the equipment of the type shown in the drawings as follows:

First, the inflatable polyurethane building mandrel was inflated to about five pounds per square inch, then a coating of a releasing agent was applied over the surface of the inflated mandrel. The releasing agent was a commercial paste wax. A coating of a liquid polyurethane reaction mixture was sprayed over the building mandrel. Then the building mandrel was wrapped with a continuous nylon filament in a helical pattern with the continuous filament being dip coated in the liquid polyurethane reaction mixture. The direction of wrap was so adjusted to obtain a star-like wrap pattern on the end of the building mandrel to build a bead to receive the closure means. At this point the wrap direction was changed to wrap the helical windings essentially circumferentially and contiguously over the surface of the mandrel. Two additional spray coats of the liquid polyurethane reaction mixture was applied over the contiguous fabric reinforcement. Then the liquid polyurethane reaction mixture was permitted to react and cure. The mandrel was deflated and the cured container was removed from the deflated mandrel. End plates were placed thereon to obtain the finished container.

The liquid polyurethane reaction mixture used in this example was prepared from a prepolymer. This prepolymer was prepared by reacting 6 moles of toluene diisocyanate with 2 moles of a polyester prepared by the condensation of adipic acid with an excess of a mixture consisting of 80% ethylene glycol and 20% propylene glycol and 1 mole of a polyester prepared by the condensation of adipic acid with an excess of butane diol.

This prepolymer was used to prepare a black masterbatch by mixing 240 parts of this prepolymer with 142 parts of carbon black, 86 parts of Cellosolve acetate and 377 parts of methyl ethyl ketone.

A cement was made by mixing a mixture of 51 parts of a 10% solution of cellulose acetate butyrate in methyl ethyl ketone, 39 parts of submicroscopic silica (Cab-O-Sil) with a well dispersed mixture of 389 parts of Cellosolve acetate, 220 parts of methyl ethyl ketone and 82 parts of the above mentioned black masterbatch.

Component 1 of the spray mixture was formed by mixing 349 parts of the above cement with 548 parts of the above mentioned prepolymer.

Component 2 of the spray mixture was made by mixing 199 parts of MDA (the tradename abbreviation for methylene dianiline) with 538 parts of methyl ethyl ketone.

Components 1 and 2 were mechanically metered in the proportions to give about 0.7 to 0.9 mole of MDA for each mole of excess toluene diisocyanate over that equivalent to the polyester and were mixed continuously and then were sprayed. The continuous metering, mixing and spraying equipment is preferred with MDA and the other fast crosslinkers since the mixture of components 1 and 2 remains sprayable for less than 10 minutes, normally.

EXAMPLE II

Other filament-wound containers were made according to the procedure of Example I using the following prepolymers in the formulation of component 1 in Example I:

*Prepolymer A*

A reaction product of 2 mols of tolylene diisocyanate with about 1 mol of a polyester formed by condensing an excess of ethylene glycol with adipic acid.

*Prepolymer B*

Same as Prepolymer A except the mol ratio used was 1.1 to 1.

*Prepolymer C*

Same as Prepolymer A except propylene glycol was used to produce the polyester.

*Prepolymer D*

Same as Prepolymer A except methylene diphenylene diisocyanate was used instead of toluene diisocyanate.

*Prepolymer E*

The same as Prepolymer C except methlyene diphenylene diisocyanate was used instead of toluene diisocyanate.

*Prepolymer F*

The reaction product of 2 mols of toluene diisocyanate with 1 mol of a poly tetramethylene ether glycol having a molecular weight of about 3000. This prepolymer was preferred for the exposed polyurethane coating as it had greater resistance to degradation.

In the preferred embodiment of this invention the outside and inside surface of the container was coated with a polyether-polyol type polyurethane reaction mixture such as the Prepolymer F described above. By coating the outside surface and inside surface of the container with a polyurethane of the polyether-polyol type the resulting container has improved resistance against atmospheric degradation caused by contamination and other biological type decomposition.

While certain representative embodiments and details have been shown for the purpose of illustrating the invention, it will be apparent to those skilled in the art that various changes and modifications may be made therein without departing from the spirit or scope of the invention.

What is claimed is:

1. The method of making a closed container which comprises the steps of (1) coating a mandrel with at least one spray coat of liquid polyurethane reaction mixture;
(2) wrapping over the sprayed coat of polyurethane a fabric containing a coating material to reinforce the container;
(3) applying at least one coat of liquid polyurethane reaction mixture over the fabric;
(4) causing the liquid reaction mixture to react and cure and removing the cured product from the building mandrel; and
(5) putting on the closure members to obtain a closed container; said liquid polyurethane reaction mixture consisting essentially of at least one mol of a reactive hydrogen containing polymeric material of about 500 to 8000 molecular weight and about 1.5 to about two mols of an organic diisocyanate and about 0.1 to 0.9 mol of a crosslinker selected from the class of the organic primary amines, monomeric glycols, and sufficient solvent to permit the mixture to be spread.

2. The method of making a closed container comprising the steps of (1) applying a coat of liquid polyurethane reaction mixture to a mandrel which has an outer surface to which a liquid polyurethane reaction mixture does not adhere when cured;
(2) wrapping the outer surface of the spray coated mandrel with a continuous filament containing a polyurethane coating material with the direction of wrap being such as to reinforce the container to give greater resistance to bursting;
(3) applying a coat of liquid polyurethane reaction mixture over the continuous filament and reacting the mixture to obtain a cured polyurethane container containing filament reinforcing;
(4) removing the container from the mandrel; and
(5) attaching closure means to each opening of said container.

3. The method of making a closed container having a cylindrical body and rounded heads secured to the body which comprises the steps of (1) applying at least one coat of a liquid polyurethane reaction mixture to a building form having essentially the shape of the container desired;
(2) substantially contiguously wrapping over the coating of polyurethane a continuous filament to reinforce the container;
(3) applying at least one coat of polyurethane over the filament reinforcement and curing the polyurethane;
(4) removing the container from the building form; and
(5) fitting closure means to the open end of the container; said liquid polyurethane mixture comprising at least one mol of a reactive hydrogen containing polymeric material of about 500 to 8000 molecular weight and about 1.5 to about two mols of an organic diisocyanate and about 0.1 to 0.9 mol of a crosslinker selected from the class of the organic primary amines, monomeric glycols, and sufficient solvent to permit the mixture to be spread.

4. The method of claim 1 wherein the fabric reinforcement is applied as a continuous filament wrap around substantially the periphery of the container.

5. The method of claim 1 wherein the fabric reinforcement is applied as a continuous filament around substantially the periphery of the container and in a manner to give a built-up bead section in the ends of the container.

6. The method of claim 2 wherein the liquid polyurethane mixture comprises at least one mol of a reactive hydrogen containing polymeric material of about 500 to 8000 molecular weight and about 1.5 to about two mols of an organic diisocyanate and about 0.1 to 0.9 mol of a crosslinker selected from the class of the organic primary amines, monomeric glycols, and sufficient solvent to permit the mixture to be spread.

7. The method of claim 4 wherein the liquid polyurethane mixture comprises at least one mol of a reactive hydrogen containing polymeric material of about 500 to 8000 molecular weight and about 1.5 to about two mols of an organic diisocyanate and about 0.1 to 0.9 mol of a crosslinker selected from the class of the organic primary amines, monomeric glycols, and sufficient solvent to permit the mixture to be spread.

8. The improvement of claim 3 wherein the filament is nylon.

9. The method of claim 2 wherein the liquid polyurethane mixture comprises at least one mol of a reactive hydrogen containing polymeric material of about 500 to 8000 molecular weight and about 1.5 to about two mols of an organic diisocyanate and about 0.1 to 0.9 mol of a crosslinker selected from the class of the organic primary amines, monomeric glycols, and sufficient solvent to permit the mixture to be spread.

10. The method of making a closed container comprising the steps of (1) inflating a collapsible mandrel which has an outer surface to which a liquid polyurethane reaction mixture does not adhere when cured;
(2) positioning a closure insert at at least one end of the inflated collapsible mandrel;
(3) applying a coating of liquid polyurethane reaction mixture to the surface of the mandrel and the insert;
(4) wrapping the coated surface of the mandrel and closure insert with a continuous filament with the direction of wrap being such as to reinforce the container to give said container greater resistance to bursting;
(5) applying a coat of liquid polyurethane reaction mixture over the continuous filament and reacting the mixture to obtain a cured polyurethane container having fabric reinforcement;
(6) deflating the mandrel and removing the container from the mandrel; and
(7) fitting a closure means on each of the closure inserts.

11. The method of claim 10 wherein the liquid polyurethane mixture comprises at least one mol of a reactive hydrogen containing polymeric material of about 500 to 8000 molecular weight and about 1.5 to about two mols of an organic diisocyanate and about 0.1 to 0.9 mol of a crosslinker selected from the class of the organic primary amines, monomeric glycols, and sufficient solvent to permit the mixture to be spread.

12. The improvement of claim 10 wherein the closure means is a screw cap.

13. The method of claim 1 wherein the two closure members are fitted in cooperative relationship by means of an anchoring means.

References Cited

UNITED STATES PATENTS

| | | | |
|---|---|---|---|
| 3,085,027 | 4/1963 | Porteous | 117—161 X |
| 3,252,848 | 5/1966 | Borsellino | 161—190 X |
| 2,194,132 | 3/1940 | Voit et al. | 156—174 X |
| 2,676,164 | 4/1954 | Charlton et al. | |
| 2,848,133 | 8/1958 | Ramberg. | |
| 2,906,314 | 8/1959 | Trevaskis | 156—117 X |
| 2,978,004 | 4/1961 | Smith | 150—.5 |
| 3,100,759 | 8/1963 | Boussu et al. | 260—75 |
| 3,210,228 | 10/1965 | Bluck | 156—173 X |

EARL M. BERGERT, *Primary Examiner.*

J. P. MELOCHE, *Assistant Examiner.*